United States Patent
Das et al.

(10) Patent No.: US 11,178,165 B2
(45) Date of Patent: *Nov. 16, 2021

(54) METHOD FOR PROTECTING IOT DEVICES FROM INTRUSIONS BY PERFORMING STATISTICAL ANALYSIS

(71) Applicant: Gryphon Online Safety, Inc., San Diego, CA (US)

(72) Inventors: Arindam Das, Bothell, WA (US); Arup Bhattacharya, San Diego, CA (US); John J Wu, San Diego, CA (US)

(73) Assignee: Gryphon Online Safety, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/914,709

(22) Filed: Jun. 29, 2020

(65) Prior Publication Data

US 2020/0329065 A1 Oct. 15, 2020

Related U.S. Application Data

(63) Continuation of application No. 15/839,766, filed on Dec. 12, 2017, now Pat. No. 10,771,487.

(60) Provisional application No. 62/432,700, filed on Dec. 12, 2016.

(51) Int. Cl.
| | |
|---|---|
| *H04L 29/06* | (2006.01) |
| *G06N 3/08* | (2006.01) |
| *H04W 4/70* | (2018.01) |
| *H04W 12/121* | (2021.01) |
| *H04W 12/088* | (2021.01) |

(52) U.S. Cl.
CPC ............ *H04L 63/1425* (2013.01); *G06N 3/08* (2013.01); *H04L 63/10* (2013.01); *H04W 4/70* (2018.02); *H04W 12/121* (2021.01); *H04L 63/0236* (2013.01); *H04L 2463/144* (2013.01); *H04W 12/088* (2021.01)

(58) Field of Classification Search
CPC . H04L 63/10; H04L 63/1425; H04L 63/0236; H04L 2463/144; H04W 12/1201; H04W 4/70; H04W 12/0808; H04W 12/121; H04W 12/088; G06N 3/08
USPC .......................................................... 726/23
See application file for complete search history.

(56) References Cited

U.S. PATENT DOCUMENTS

| | | | | |
|---|---|---|---|---|
| 10,931,692 B1* | 2/2021 | Mota | ................... | H04L 63/1458 |
| 2004/0062199 A1* | 4/2004 | Lau | ........................ | H04L 1/20 |
| | | | | 370/230 |
| 2014/0283030 A1* | 9/2014 | Moore | ................ | H04L 63/0236 |
| | | | | 726/22 |
| 2017/0063909 A1* | 3/2017 | Muddu | ............... | G06F 16/9024 |

(Continued)

OTHER PUBLICATIONS

Real Time Intrusion and Wormhole Attack Detection in Internet of Things Pavan Pongle; Gurunath Chavan 9, Jul. 2015 (Year: 2015).*

*Primary Examiner* — Benjamin A Kaplan

(57) ABSTRACT

Various embodiments provide an approach to detect intrusion of connected IoT devices. In operation, features associated with behavioral attributes as well as volumetric attributes of network data patterns of different IoT devices is analyzed by means of statistical analysis to determine deviation from normal operation data traffic patterns to detect anomalous operations and possible intrusions. Data from multiple networks and devices is combined in the cloud to provide for improved base models for statistical analysis.

4 Claims, 9 Drawing Sheets

(56) References Cited

U.S. PATENT DOCUMENTS

2017/0257388 A1* 9/2017 Addepalli ............ H04L 63/1416
2018/0152474 A1* 5/2018 Winquist ............. H04L 63/1458
2019/0124099 A1* 4/2019 Matselyukh .......... H04L 41/142

* cited by examiner

METHOD FOR PROTECTING IOT DEVICES FROM INTRUSIONS BY PERFORMING STATISTICAL ANALYSIS

RELATED APPLICATIONS

This application is related to the following:
U.S. Provisional Patent Application Ser. No. 62/432,700, filed Dec. 12, 2016 (the "Parent Provisional"); and
U.S. Non-Provisional patent application Ser. No. 15/839,766, filed Dec. 12, 2017 (the "Parent Non-Provisional").

This application claims priority to the Parent Provisional and Parent Non-Provisional, and hereby claims benefit of the filing date of the Parent Provisional pursuant to 37 C.F.R. § 1.78.

The subject matter and contents of the applications referenced above are expressly incorporated herein in their entireties.

BACKGROUND OF THE INVENTION

Field of the Invention

The present disclosure relates to methods, systems and apparatus for protecting networked connected IoT devices from intrusion.

Description of Related Art

The proliferation of connected IoT devices provides an avenue for malicious actors to hack into these connected IoT devices to steal personal information, create botnets by utilizing the compromised IoT devices to mount attacks such as Denial of Service attacks, to spy on unsuspecting users with such IoT devices in their homes, and can be a security threat for safety and well being of users of such IoT devices, including minors. Parents with underage children have a need to guard their children's information. The current mechanisms to allow such control rely on manufacturer chosen default passwords to allow or deny access to such IoT devices. Need exists for an integrated and wholesome approach to securing the modern connected home.

For the reasons stated above, and for other reasons stated below, which will become apparent to those skilled in the art upon reading and understanding the present specification, there is a need in the art for methods, systems and apparatus to detect unauthorized intrusion of connected IoT devices and for blocking compromised IoT devices to provide user safety and protection.

BRIEF SUMMARY OF THE INVENTION

This Summary is provided to introduce a selection of concepts in a simplified form that are further described below in more detail in the Detailed Description. This Summary is not intended to identify key or essential features of the claimed subject matter.

Various embodiments provide methods, systems and, apparatus for detecting unauthorized intrusion in IoT devices. Embodiments may provide methods, systems and, apparatus for detecting such intrusions by determining a statistical deviation between baseline and operational data. Embodiments may determine such deviation by performing statistical analysis of a network pattern data created by collecting data during normal operating mode of a specific IoT device, in conjunction with operational network pattern data for that IoT device collected during real time operations of that IoT device. Embodiments may provide for statistical analysis being performed while using abovementioned data from similar or dissimilar IoT devices.

Embodiments may provide for use of a set of behavioral attributes associated with a specific type of IoT device. Some embodiments may provide for use of a set of volumetric attributes associated with a networked IoT device for performing such statistical analysis. Embodiments may provide for utilizing both behavioral attributes as well as volumetric attributes in combination for performing such statistical analysis.

BRIEF DESCRIPTION OF DRAWINGS

The several embodiments may be more fully understood by a description of certain embodiments in conjunction with the attached drawings in which.

Figure 1:
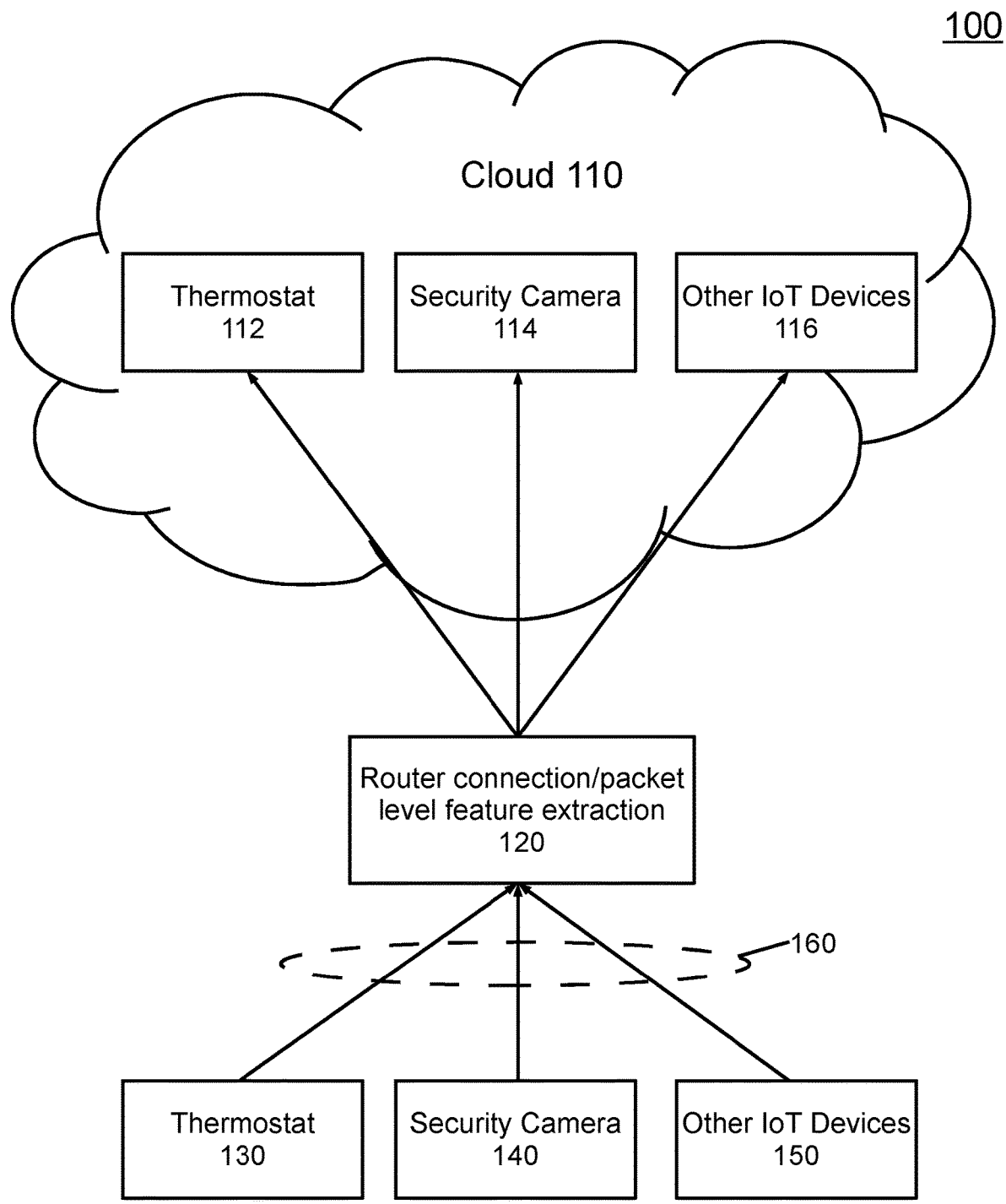
FIG. 1 illustrates, in block diagram form, the series of steps involved in obtaining reference traffic pattern data for IoT devices operating in normal mode for staring in a cloud storage according to some embodiments.

In the figures, similar elements will be similarly numbered whenever possible. However, this practice is simply for convenience of reference and to avoid unnecessary proliferation of numbers, and is not intended to imply or suggest that identity is required in either function or structure in the several embodiments.

DETAILED DESCRIPTION

As disclosed herein, it will be understood that current systems, apparatus and methods of safeguarding these connected IoT devices are either inadequate or require complexity beyond the capabilities of most consumers. The current mechanisms available to ensure a safe and controlled environment for consumers and their families are cumbersome, expensive, and generally require a higher level of expertise in current technologies than average consumers understand or use properly. These problems and others may be addressed, lessened or resolved by systems, apparatus and methods as herein disclosed by analyzing network traffic pattern data for such IoT devices and automatically detecting patterns that may indicate abnormal activity for that IoT device and may be of concern. Some embodiments may combine data from multiple users of similar IoT devices in cloud storage, differentiate between the different type of IoT devices, as well as distinguish similar functionality IoT devices from different manufacturers to improve the capabilities of detecting compromised IoT devices automatically and provide user-friendly means of managing such intrusions. It will be understood that such controls may be automated as well as allow for remote capabilities to manage such IoT devices.

As disclosed herein, the network traffic pattern data for IoT devices communicating over a network can be classified under two broad categories depending upon the particular attributes of that data: i) data associated with certain characteristics what is termed herein as behavioral features, and ii) data associated with certain other characteristics what is termed herein as volumetric features. In embodiments, the behavioral or volumetric features used for intrusion detection may not include all behavioral or volumetric attributes respectively, associated with an IoT device. In other embodiments, the behavioral or volumetric features used to detect anomalous operation may also include other features that may not be behavioral or volumetric attributes associated with a particular IoT device.

Behavioral features would generally include characteristics that are primarily dependent upon characteristics such as the type of IoT device, it's intended use, its normal connection points, the limited number of communication mechanisms for communicating with other devices, consumers, and servers and other similar characteristics. For example, but not a limitation, for an IoT device like a smart thermostat, which is communicating through a router with a particular server in the cloud to gather and analyze the temperature data over time for a particular user, some of the behavioral features that may be relevant for the network traffic pattern data for that IoT device may include: a subscriber identifier, a host port number, a server port number, an IP address of the IoT device, an IP address of the server, IoT device ID for the IoT device, and an identification code for the router.

In comparison, the volumetric features are based on characteristics that are generally not associated with the behavioral aspects of the IoT device, but rather characteristics which would be otherwise similar for different types of IoT devices. For example, but not a limitation, for the IoT device like a smart thermostat in the last example above, some of the volumetric features that may be relevant for the network traffic pattern data for that IoT device may include: total number of IP layer bytes received from a particular server, total number of IP layer bytes sent by the IoT device, total number of application layer bytes received from a particular server, total number of application layer bytes sent by the IoT device, transport layer protocol used for packet transfers, the amount of time the IoT device was communicating with a particular server, application layer protocol used for packet transfers, and status bit information from packet headers that may be collected over time.

Unlike a traditional general-purpose computer network, in which the devices are used for multitude of purposes and communicate with a variety of other devices, servers, users, and internet websites, and utilize a multitude of ports, transport protocols, and mechanisms for that communication, as disclosed herein, the connected IoT devices are relatively constrained devices as to their functionality and are specifically targeted to perform particular specific functions. Furthermore, unlike the traditional computer networks where the points of interconnect vary widely over time, the IoT devices generally communicate with a relatively limited universe of other devices and servers and utilize a limited set of ports and protocols for that communication. Furthermore, the IoT devices generally retain the same connection points over time as compared to the general computer network. As a result, a number of attributes associated with the network data traffic patterns for such IoT devices may be useful in determining a intrusion by detecting significant change in those network data traffic patterns associated with those attributes, which might not be possible in a traditional computer network because of varying dissimilarity of network traffic pattern data associated with those attributes due to a relatively wider variation of connection points, particular application of the computer, users utilizing the computer, lack of similarity in use from day to day, etc.

On the other hand, these attributes could be significantly different for different types of IoT devices. For example, the connection points, ports, amount of data being transferred with other connection points and servers would be drastically different for a video or audio streaming IoT device as compared to an IoT device targeted for a home automation application such as a smart thermostat or a smart lighting control IoT device. There may also be significant differences in those data patterns for even IoT devices targeted for similar use depending upon the manufacturer of those IoT devices.

As disclosed herein, every IoT device is first monitored for a certain predetermined period of time, the so-called training period. During this period, several attributes are logged for each packet, such as remote IP address, remote port number, IoT device (local) port number, traffic direction (local to remote or remote to local), number of bytes, etc. It would be understood that even though the description here uses packet level attributes, the concepts are generic enough and could be implemented with connection (flow) level attributes. In certain embodiments, the logged data for such attributes may be combined to form the features to be used for detecting anomalous operations of the IoT device.

Typically, machine learning based network intrusion detection methods rely on the availability of clean as well as malicious traffic patterns for training purposes. However, it is virtually impossible to simulate or gather malicious traffic data for all possible threat vectors. Furthermore, threat vectors usually morph over time and it is unrealistic to assume that a particular threat vector seen in the recent past will reappear in the future unchanged. The current subject matter utilizes what is often termed "novelty detection," and relies on only the availability of clean training data and attempts to learn the "contours" of normal behavior, which are then used to distinguish between normal and abnormal behavior based on the statistical analysis of the network traffic pattern data during real time operation of the IoT device. In an embodiment an intrusion detection mechanism may be implemented without verifying operating data is clean.

In an example embodiment of the subject matter, the intrusion detection mechanism may be a dual path anomaly detection system. The first path of the anomaly detection system implements the analysis based on behavioral features and can be termed "Behavioral Attribute Detector" (BAD), which operates as described below.

In an example embodiment, three particular packet attributes: the remote IP address, remote port number, and the IoT device port number, are logged during the training period. The training period is of a relatively large duration (the Training Window), so as to collect enough information to form a good statistical sample for the statistical analysis of the data. As an example and not as a limitation, the Training Window may be a period of ten (10) days in duration for continuous operation of subject IoT device. Several long-term probability distributions, over the entire Training Window, are computed from the training data. In particular, one-dimensional distributions are computed for each of the three applicable BAD packet attributes, and two two-dimensional distributions are computed, remote IP address vs. remote port number, and remote IP address vs. local port number. In an embodiment, these five probability distributions constitute the "baseline long term distributions".

The same training data is then processed over much smaller time windows (the Test Window). For example only and not as a limitation, a test Window may be time duration of thirty (30) seconds each. For each such window, five more probability distributions are computed which constitute the "baseline short term distributions".

It is natural to expect that the baseline short-term distributions will differ from the baseline long-term distributions. The distances/divergences between the baseline long term distributions and each set of baseline short-term distributions is then computed through statistical analysis. Several statistical analysis methods exist for computing such distances, e.g., Bhattacharya distance, Kullback-Leibler divergence, Jensen-Shannon divergence, and Renyi divergence, etc. It will be understood that any accepted method for calculating distances or divergence may be utilized.

Using the vector of distances/divergences in above step, appropriate thresholds may be determined, which may be used during run time to classify whether a certain batch of packets within a certain Test Window is clean or anomalous.

During IoT device operation, if the distance between the short-term probability distribution(s) and the baseline long term distribution(s) exceed the appropriate threshold(s), the traffic may be deemed to be "potentially anomalous" and the IoT device may be put under observation for an extended period of time, spanning multiple Test Windows.

In some embodiments, the statistical analysis may be performed as explained in the following example. Let T denote the number of Test Windows over which an IoT device is being monitored. During this extended monitoring period, for each Test Window, compute the short time probability distributions and their distances from the baseline long-term distributions. Furthermore, the short term distributions in the second window may be compared to those of the first window, short term distributions in the third window may be compared to the "union" probability distribution over the first two windows, short term distributions in the $T^{th}$ window may be compared to the union probability distribution over the first T−1 windows. All these distances may be analyzed, possibly including an explicit feedback from the user in the analysis, before a final decision is made on whether the situation may be anomalous or not. If anomalous, the IoT device may be quarantined. Adoption of an extended monitoring period and two-pronged distance comparisons, between short-term distributions and long-term distributions, and across multiple short-term distributions over time, provides for a relatively low probability of false alarm.

As mentioned above, the intrusion detection mechanism in the example may use a dual path scheme. The second path of the anomaly detection method may be termed as "Volumetric Attribute Detector" (VAD), which in certain embodiments may operate as described below.

For this path of the anomaly detection, the relevant features may be the volumetric connection level attributes, such as connection duration, number of bytes sent by the IoT device to a remote server or a remote connection node per connection, number of bytes received by the IoT device from such remote server or remote connection node per connection, whether the connection is terminated properly, etc. Unlike BAD, VAD may not use behavioral attributes such as IP addresses and port numbers.

Machine learning techniques such as one-class support vector machines and/or auto-encoder neural networks may be used with connection level volumetric attributes obtained during the training period to learn the contours of normal traffic behavior. During run time, these contours are used to distinguish between normal and abnormal behavior.

In some embodiments, the determinations obtained from the BAD and VAD detectors and the results of the statistical analysis performed in the dual paths may be integrated in an "action module" where a final decision may be made on whether the IoT device is operating within normal parameters or the data predicts anomalous operations indicating intrusion.

In some embodiments, the training data obtained may be segregated in a cloud storage categorized by various IoT device specific attributes such as device type, device manufacturer, subscriber ID etc. In yet other embodiment the stored training data in the cloud storage may be a combination of training data obtained from multiple routers that have different types of IoT devices connected to the network through those routers.

In yet other embodiment, the stored data from the training in the cloud may aggregate the statistical characteristics of multiple IoT devices of one type from the same manufacturer. In some embodiment, the training data may also contain a list of known IoT devices by type, manufacturer, etc., so that the data stored for these IoT devices may be used immediately for a new IoT device of the same type, thus alleviating the need to collect the training data for each new IoT device that is connected to a router. Yet other embodiments may aggregate the data from multiple routers and make use of the data from similar IoT devices across multiple routers to eliminate or shorten the training window. In yet another embedment, the cloud data may only contain one model per IoT device per manufacturer. In some embodiments, the model training data in the cloud storage may be updated over time based on operational analysis of the network traffic pattern data from multiple IoT devices and multiple routers sharing the cloud storage.

In some embodiments, the models used for statistical analysis may use completely different algorithms for different type of IoT devices. In some embodiments, the training data may be periodically updated by utilizing the training methods explained above on a periodic basis to enhance the base line of the network traffic pattern data for the IoT device.

In some embodiments, the relevant data for an IoT device associated with certain attributes, behavioral or volumetric, may be cached in the local memory of the router to allow for fast processing of data during normal operations of the IoT device.

Example of Intrusion Detection in IoT Devices

FIG. 1 illustrates, in a block diagram form, an example 100 for extracting reference traffic pattern data for multiple IoT devices and storing them in cloud storage that may be used to implement the techniques described herein according to some embodiments.

Referring to FIG. 1, the illustrated example implementation 100 includes: raw data being collected from multiple IoT devices by a router, number of IoT devices including a thermostat, a security camera and multiple other IoT devices of different types; the router block illustrates the feature extraction in the router based on both behavioral attributes and volumetric attributes of different IoT devices; feature extraction in the router may be for packet level features such as source and destination IP addresses, source and destination port numbers, packet size etc. according to some embodiments; feature extraction in the router may also be for connection level features such as source and destination addresses, source and destination port numbers, total number of outgoing and/or incoming bytes, connection duration, etc. according to some embodiments; the sub blocks in the cloud block may be organized by type of IoT device as depicted in FIG. 1 for thermostat, security camera and other IoT devices according to some embodiments; raw data received from IoT devices by the router is illustrated to be converted to storable feature data in cloud storage by extraction of relevant features to be stored in the cloud storage by the router. The illustration in FIG. 1, as an example and not as a limitation, may be combined with other routers to create an aggregate storage for relevant features for different devices in the cloud. In some embodiments, certain features may be relevant to both, the behavioral feature statistical analysis, and volumetric feature analysis such as source and destination addresses and source and destination port numbers.

Figure 2:
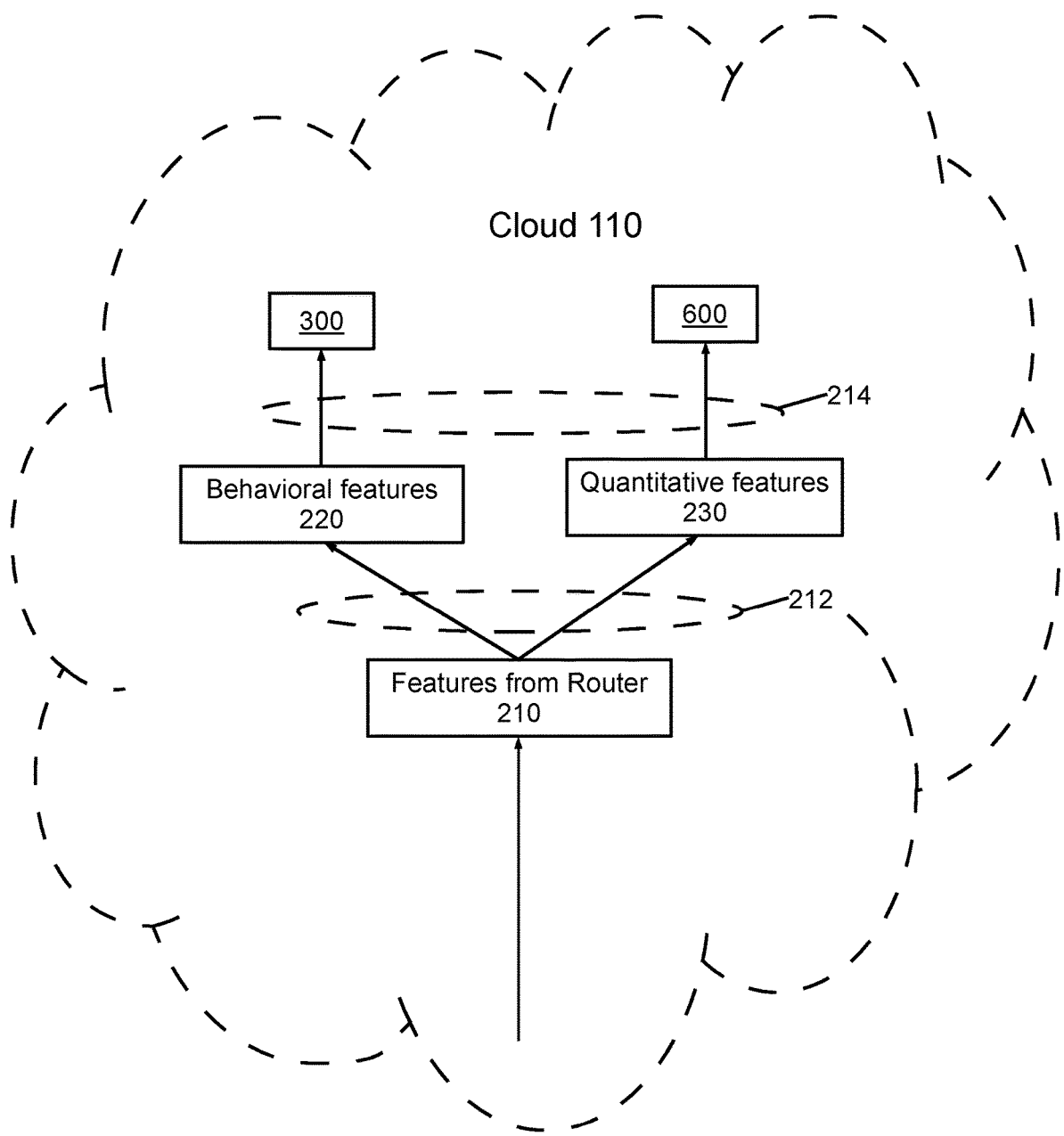
FIG. 2 illustrates, in block diagram form, the concept of extracting behavioral and volumetric features to be stored in cloud storage according to some embodiments.

FIG. 2 illustrates, in block diagram form, the division of relevant features into behavioral and volumetric categories in the cloud storage according to some embodiments. FIG. 2 also illustrates some embodiments that may implement the dual path analysis utilizing both behavioral and volumetric features. FIG. 2 further illustrates the different models for statistical analysis based on the type of features that the traffic pattern data pertains to through the processing blocks 300 and 600.

Figure 3:
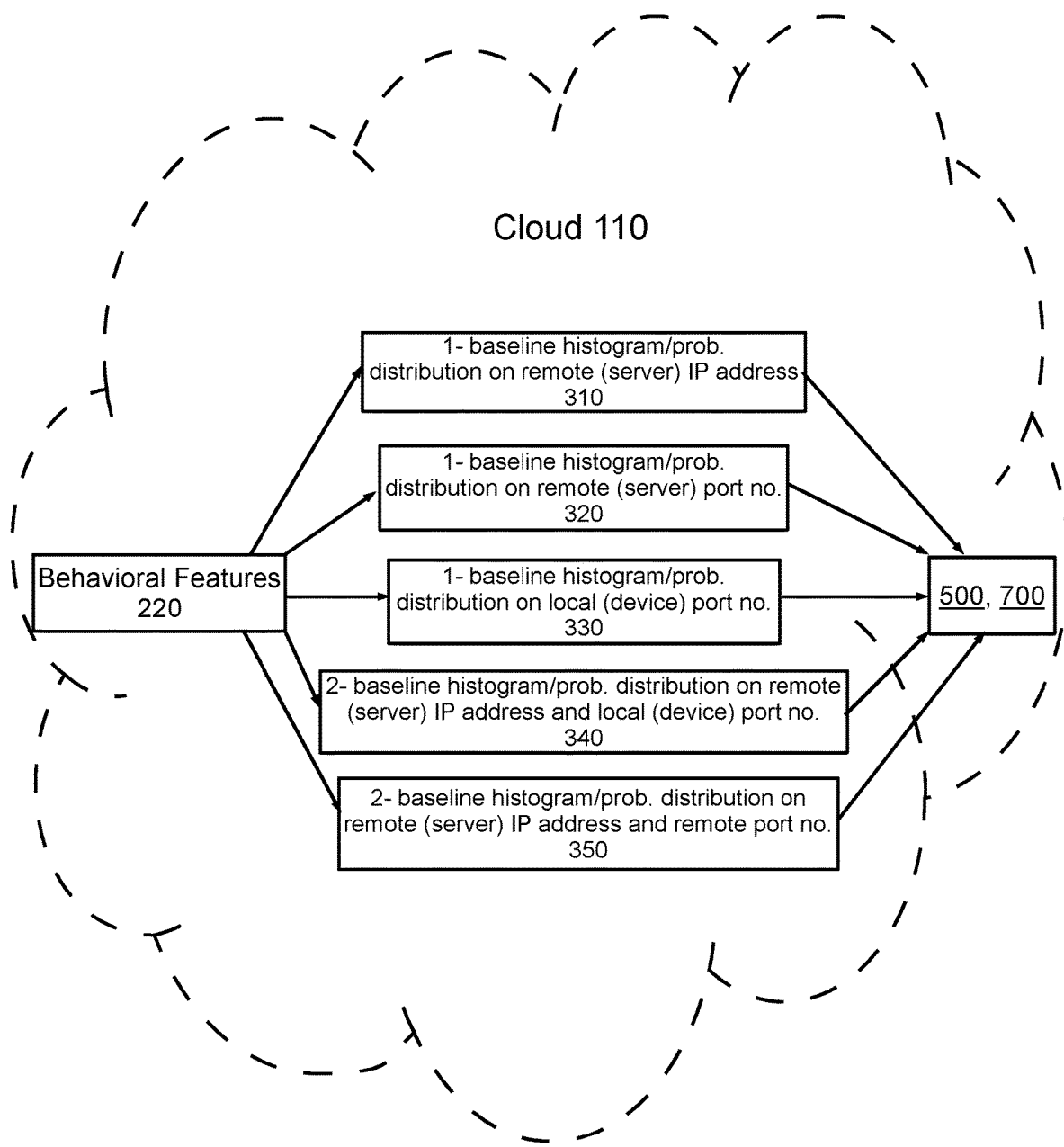
FIG. 3 illustrates, in block diagram form, the creation of multiple histograms over a duration of time for the purpose of performing statistical analysis related to certain behavioral features according to some embodiments.

FIG. 3 illustrates, in block diagram form, utilization of histograms to determine statistical deviation in traffic pattern data collected for a relatively long duration of time, the Training Window, related to certain behavioral features. FIG. 3 blocks include: a block denoting cloud storage according to some embodiments; a block denoting the step of receiving behavioral feature data such as IP addresses, and port numbers according to some embodiments; a block to create a one dimensional (1-D) baseline histogram for probability distribution of remote server IP addresses according to some embodiments; a block denoting the step of receiving behavioral feature data such as IP addresses, and port numbers according to some embodiments; a block to create a one dimensional (1-D) baseline histogram for probability distribution for remote server port numbers according to some embodiments; a block to create a one dimensional (1-D) baseline histogram for probability distribution of IoT device port numbers according to some embodiments; a block to create a two dimensional (2-D) baseline histogram for probability distribution for remote server IP addresses and IoT device port numbers according to some embodiments; a block to create a two dimensional (2-D) baseline histogram for probability distribution for remote server IP addresses and remote server port numbers according to some embodiments; block showing the further processing of such created histograms in blocks 500 (refer to FIG. 5) and 700 (refer to FIG. 7) according to some embodiments. It is to be understood that some embodiment may use a different set of behavioral features instead of the features shown in example illustration in FIG. 3.

Figure 4:
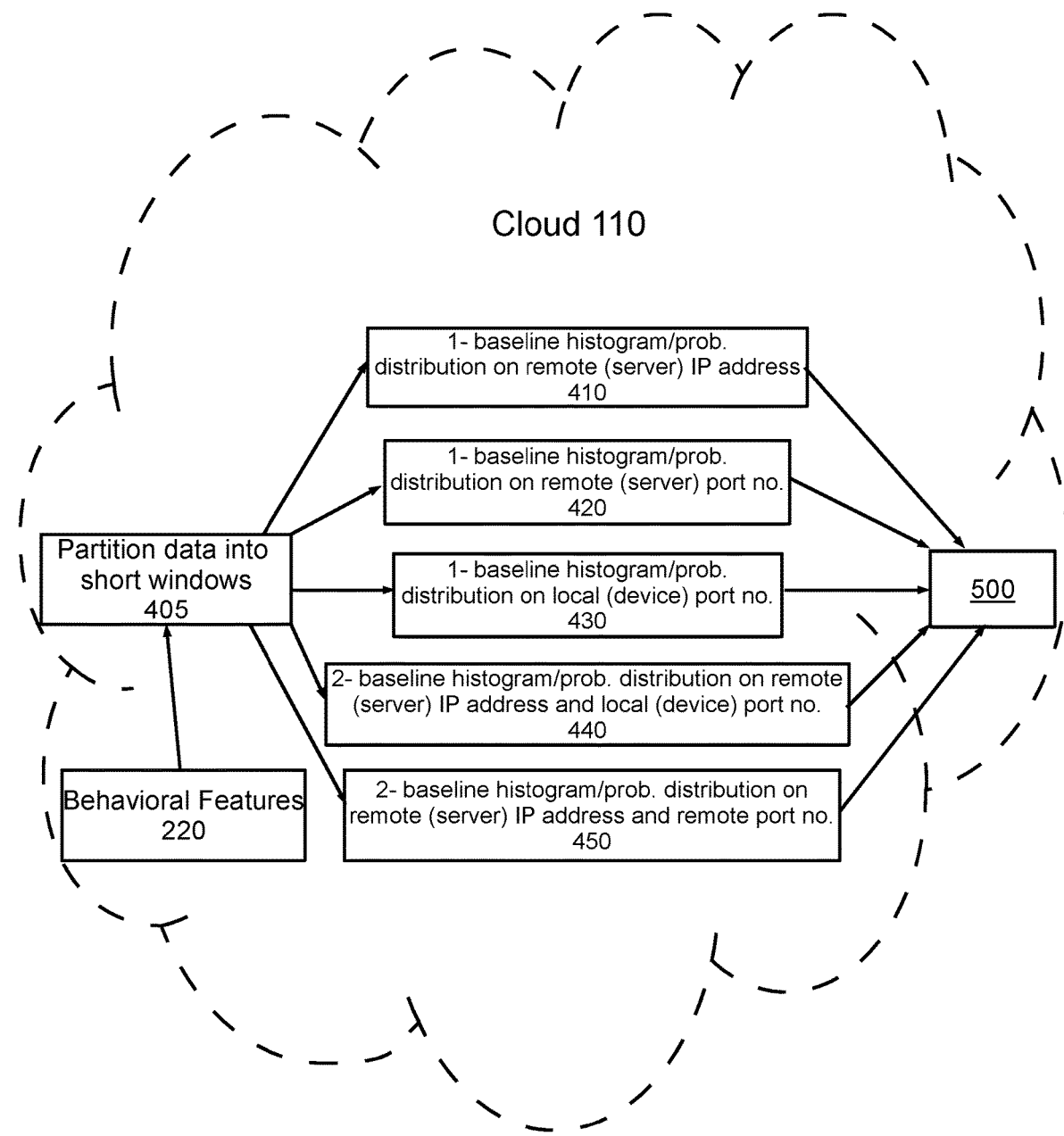
FIG. 4 illustrates, in block diagram form, the creation of multiple histograms for multiple smaller time duration for statistical analysis related to certain behavioral features according to some embodiments.

FIG. 4 illustrates, in block diagram form, utilization of histograms to determine statistical deviation in traffic pattern data collected for a relatively long duration of time, the Training Window, related to certain behavioral features, but the creation of multiple histograms being accomplished over a relatively much shorter time window within the Training Window according to some embodiment. FIG. 4 blocks include: a block denoting cloud storage according to some embodiment; a block denoting the step of receiving behavioral feature data such as IP addresses, and port numbers according to some embodiments; a block to subdivide the feature data collected over the Training Window into multiple smaller data sets over relatively smaller time windows according to some embodiments; a block to create a one dimensional (1-D) baseline histogram for probability distribution of remote server IP addresses according to some embodiments; a block denoting the step of receiving behavioral feature data such as IP addresses, and port numbers according to some embodiments; a block to create a one dimensional (1-D) baseline histogram for probability distribution for remote server port numbers according to some embodiments; a block to create a one dimensional (1-D) baseline histogram for probability distribution of IoT device port numbers according to some embodiments; a block to create a two dimensional (2-D) baseline histogram for probability distribution for remote server IP addresses and IoT device port numbers according to some embodiments; a block to create a two dimensional (2-D) baseline histogram for probability distribution for remote server IP addresses and remote server port numbers according to some embodiments; block showing the further processing of such created histograms in blocks 500 (refer to FIG. 5) according to some embodiments. It is to be understood that some embodiments may use a different set of behavioral features instead of the features shown in example illustration in FIG. 3.

Figure 5:
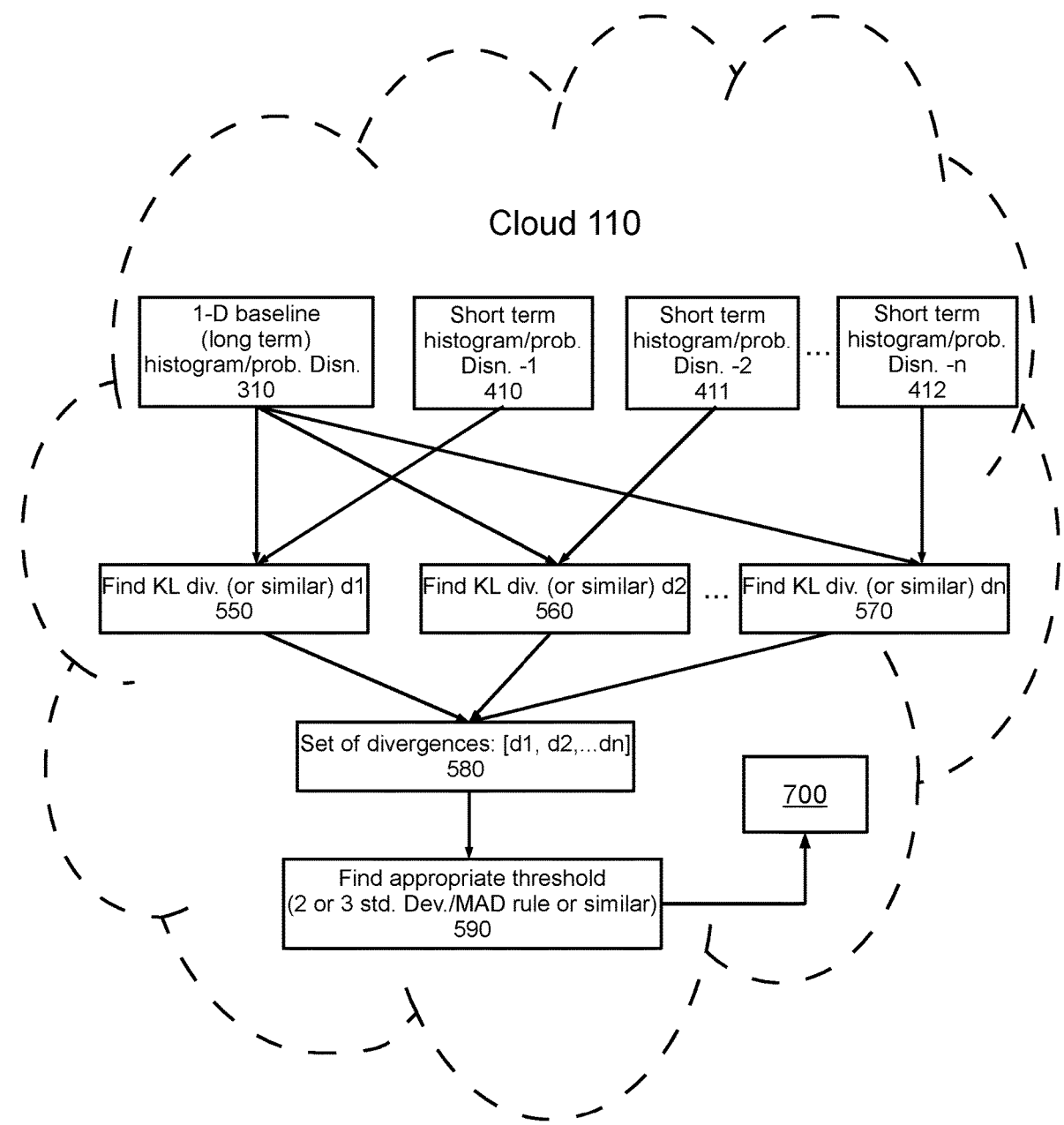
FIG. 5 illustrates, in block diagram form, the process for statistical analysis to determine a statistical deviation for data associated with multiple small window of time to data collected over the larger duration of time related to certain behavioral features and determination of appropriate thresholds for intrusion detection according to some embodiments.

FIG. 5 illustrates, in block diagram form, the steps involved in the statistical analysis of the histograms created in FIG. 4 and FIG. 5 and determination of the statistical deviation or divergence between each of the histograms for the subdivided smaller time windows to the histogram for the data associated with the larger time duration Training Window according to some embodiments. FIG. 4 blocks include: a block denoting cloud storage according to some embodiments; a block representing the histogram for a specific behavioral feature for the traffic data pattern collected for the Training Window according to some embodiments; n number of blocks, each representing the histogram for a specific behavioral feature for one of the n subdivided time windows of the traffic data pattern collected for the Training Window according to some embodiments; n blocks, one each for determination of a statistical deviation for each of the histograms for sub windows from the histogram of the data form the Training Window according to some embodiments; a block denoting the collection of all the statistical divergence as a set of divergence to be used for determination of appropriate thresholds for intrusion detection according to some embodiments; a block denoting calculation of a second or third deviation from the set of divergences to arrive at the threshold according to some embodiments; and a block depicting use of such threshold in the step to decide whether there has been an intrusion in sub block 700 (refer to FIG. 7) according to some embodiments. FIG. 5 shows the calculation of statistical divergence by utilizing the Kullback-Leibler divergence, but it is understood that embodiments may use other statistical methods to determine statistical divergence such as Bhattacharya distance, Jensen-Shannon divergence, Renyi divergence, etc. It is also understood that embodiments may use different statistical methods to calculate the second or third standard deviation for the purpose of arriving at then appropriate threshold value for intrusion detection.

Figure 6:
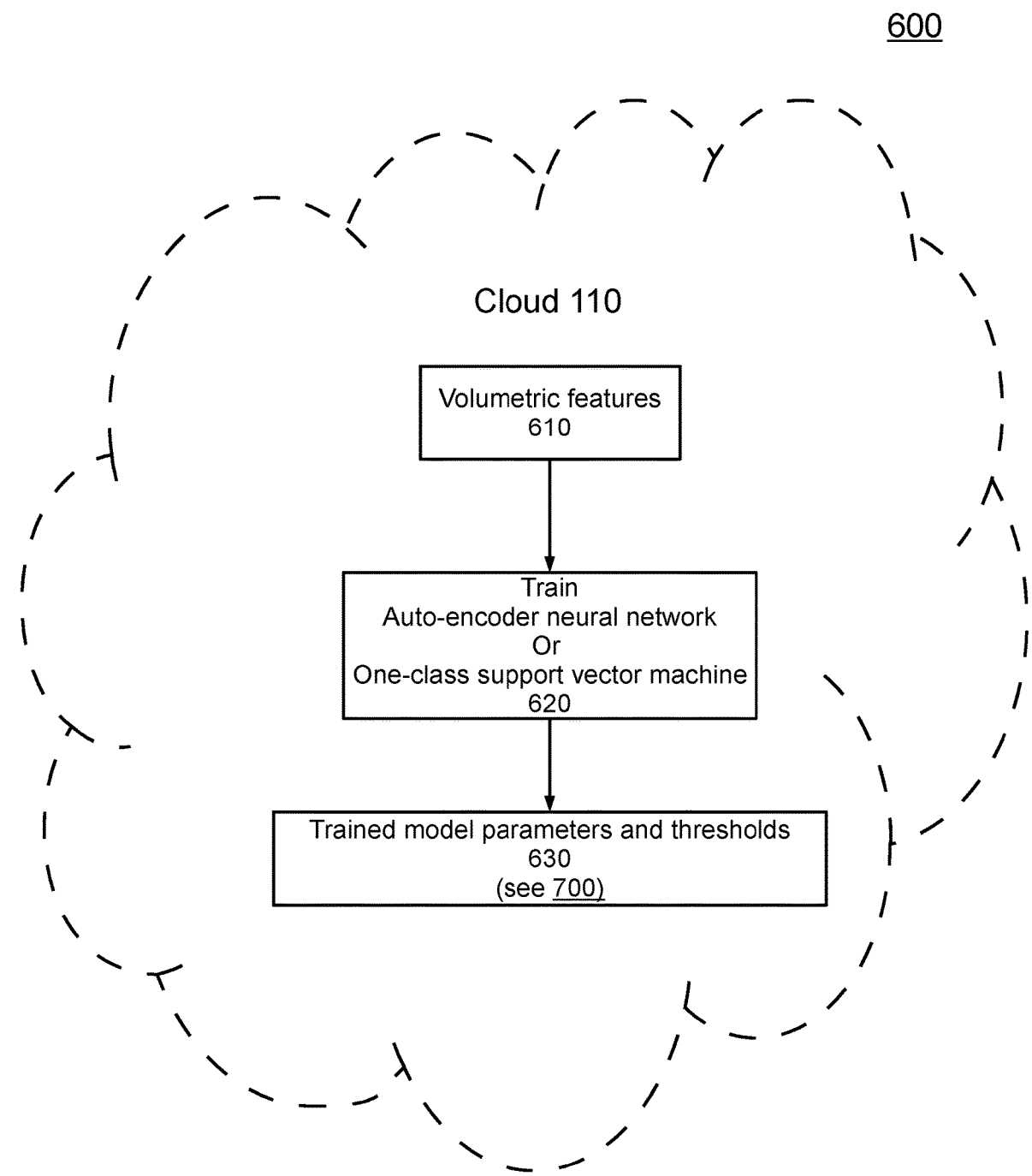
FIG. 6 illustrates, in block diagram form, the process of statistical analysis related to certain volumetric features and determination of appropriate thresholds for intrusion detection according to some embodiments.

FIG. 6 illustrates, in block diagram form, the steps involved in the statistical analysis of traffic pattern data relevant to volumetric features. FIG. 6 blocks include: a block denoting cloud storage according to some embodiments; a block representing receiving of volumetric features from the router according to some embodiments; a block representing the use of standard models available for analyzing volumetric data such as auto-encoder neural network or a one-class support vector machine according to some embodiments; and a block denoting the results of such analysis and the determination of appropriate thresholds and parameters to be used for intrusion detection based on volumetric features according to some embodiments. It is understood that such volumetric features may be total number of bytes received by IoT device, the total number of bytes sent by IoT device, the connection duration, or other volumetric features according to some embodiments.

Figure 7:
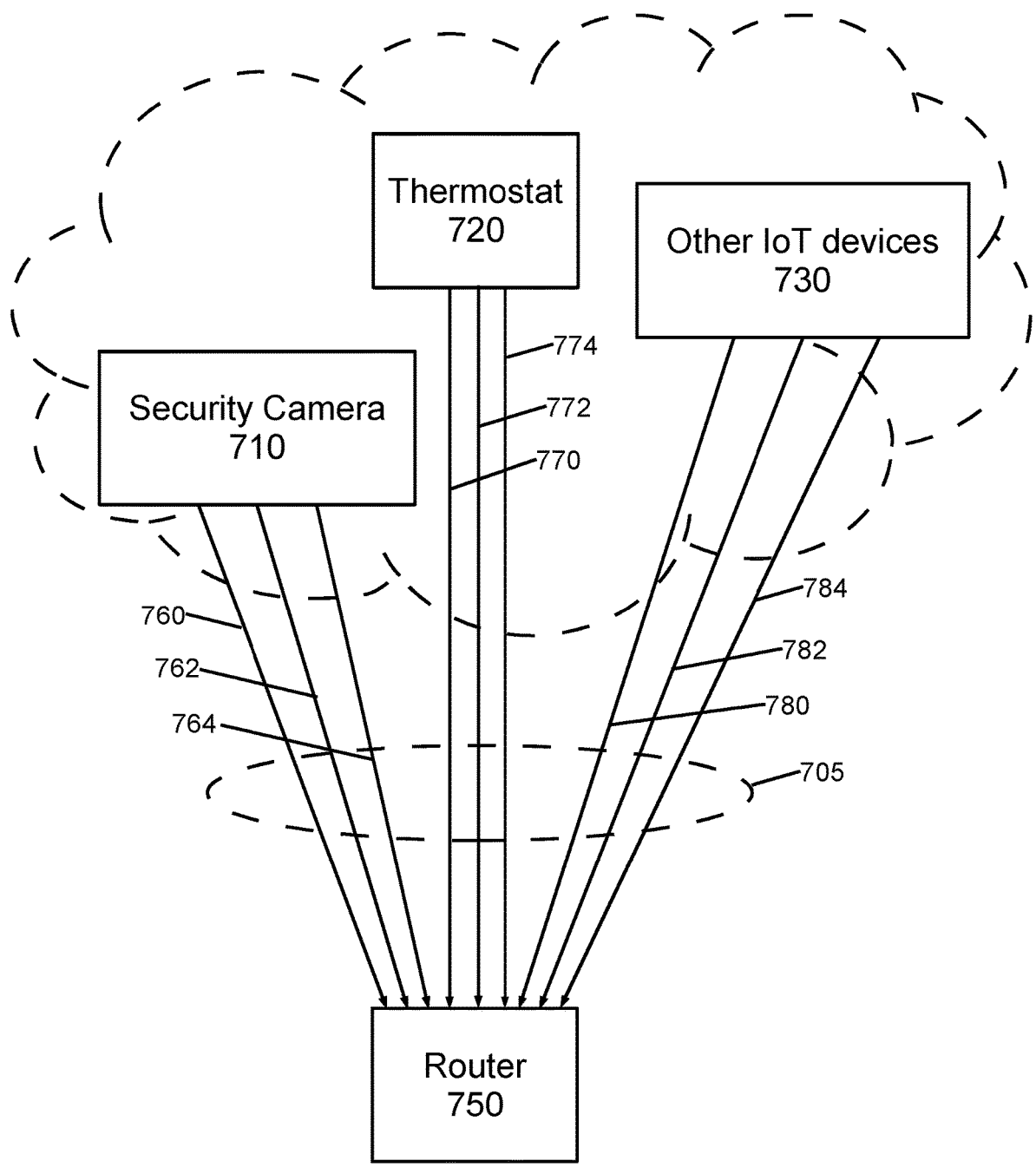
FIG. 7 illustrates, in block diagram form, the mechanism to apply the thresholds during operation to detect anomalous activity according to some embodiments.

FIG. 7 illustrates, in a block diagram form, the router receiving the appropriate thresholds and baseline histograms for behavioral features resulting from the statistical analysis, as well as the trained model parameters and thresholds resulting form the analysis of the traffic pattern data based on volumetric attributes. The FIG. 7 blocks include: a block denoting cloud storage according to some embodiments; a block denoting the router according to some embodiments; a block denoting an IoT thermostat device, a block denoting an IoT security camera device according to some embodiments; and a block denoting multiple other IoT devices according to some embodiments. It is understood that this data may be cached ion the router local memory for faster access to allow for real time intrusion detection in the router according to some embodiments. In some embodiment, the local data stored in the router may be updated on a periodic basis to push the new thresholds or further learning by the system.

Figure 8:
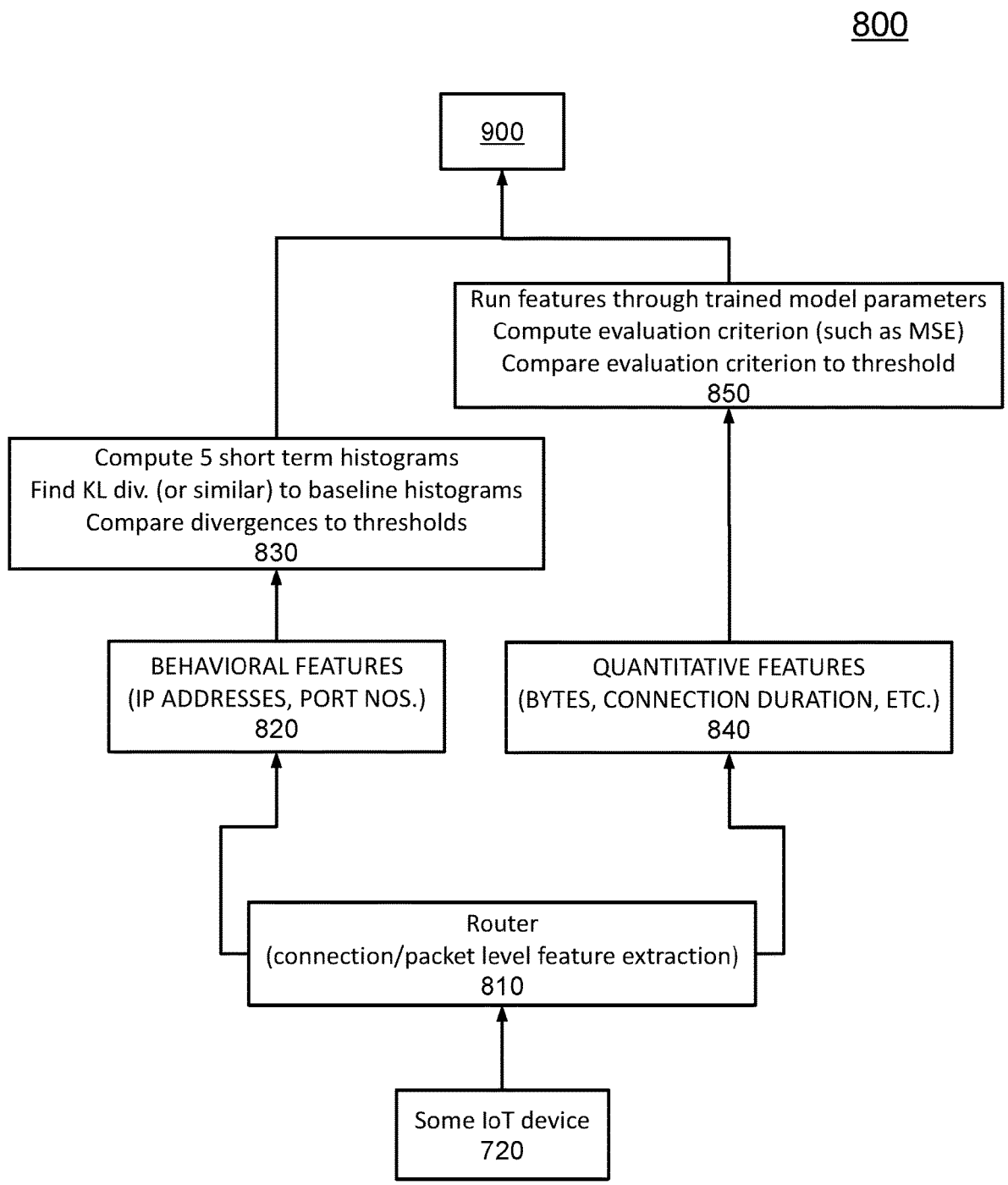
FIG. 8 illustrates, in flowchart form, initial steps of a method to use traffic pattern data in conjunction with behavioral and volumetric features of the IoT device to create the statistical data for analysis according to some embodiments.

FIG. 8 illustrates, in flowchart form, the steps involved in processing of raw traffic pattern data to perform statistical analysis in order to determine an intrusion of an IoT device. FIG. 8 flowchart includes: the block denoting an IoT device connected to a router according to some embodiments; the raw data being transferred from the IoT device to the router according to some embodiments; the step of router extracting the connection level or packet level features from the raw data and dividing the features into behavioral features such as IP addresses and port numbers, and volumetric features such as total bytes transferred and connection duration according to some embodiments; a block representing the steps involved in statistical analysis of the behavioral feature data which includes the steps of computing five short term histograms for data corresponding to short time windows, computing a statistical deviation from baseline histograms corresponding to the larger time window, the Training Window, and comparing the computed statistical divergences with the predetermined thresholds according to some embodiments; a block representing the steps involved in statistical analysis of volumetric feature data which includes the steps of processing the data through trained models such as auto-encoder neural network or a one-class support vector machine, computing evaluation criterion and comparing the evaluation criterion to the predetermined thresholds according to some embodiments; and a block 900 (refer to FIG. 9) denoting the steps involved in combining the results based on behavioral features with results based on volumetric features for intrusion detection decision making steps according to some embodiments. It is understood that embodiments may use other features as well as use alternative statistical models for the analysis of the traffic pattern data.

Figure 9:
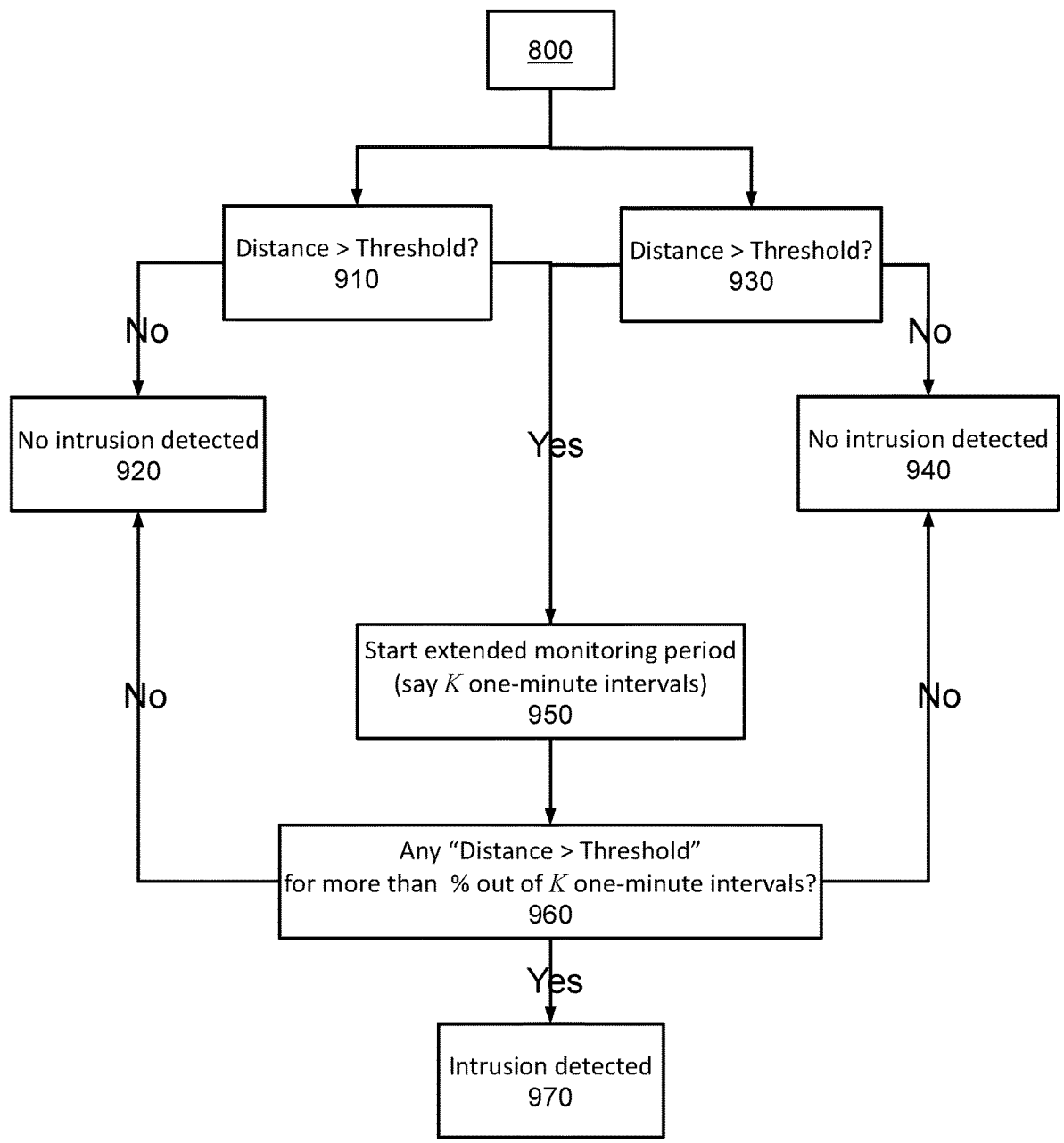
FIG. 9 illustrates, in flowchart form, final steps of the method from FIG. 8 to apply the thresholds during operation to detect anomalous activity according to some embodiments.

FIG. 9 illustrates, in a flowchart form, the steps involved in detecting an intrusion and the possible steps to safeguard against that intrusion of the IoT device according to some embodiments. FIG. 9 blocks include: block 800 representing receiving the results from the behavioral as well as volumetric statistical analysis performed in the steps illustrated in FIG. 8; two decision blocks, one each for behavioral branch and one for volumetric branch to compare whether the preset thresholds have been crossed according to some embodiments; two blocks, one each for behavioral branch and one for volumetric branch in case there was no intrusion detected according to some embodiments; a block to demonstrate the steps if an anomaly was detected in which case the traffic data pattern is analyzed over an extended period of time to determine the frequency of anomalous data over the extended period of time according to some embodiments; and a block denoting the action to be taken if the frequency of anomalous data is greater than the predetermined percentage value according to some embodiments. According to some embodiments, if anomaly is detected, in order to avoid false warnings, steps are taken to count the number of times in a predefined time period the data is found to be found anomalous before warning of an intrusion according to some embodiments. Some embodiments may further block the IoT device from the network to provide further safety. In some embodiments, the intrusion information may be communicated to a remote destination.

A method and system to detect and protect against intrusion of IoT devices is described. Although specific embodiments are illustrated and described herein, it will be appreciated by those of ordinary skill in the art that any arrangement, which is calculated to achieve the same purpose, may be substituted for the specific embodiments shown. This application is intended to cover any adaptations or variations.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments.

What is claimed is:

1. A method to identify intrusion of an IoT device comprising the steps of:
choosing a time duration;
choosing a preset reference ratio;
initializing a step counter;
initializing an abnormality counter;
obtaining reference traffic pattern data for an IoT device;

collecting operating traffic pattern data for said IoT device;
determining a statistical deviation between said reference traffic pattern data and said operating traffic pattern data;
determining, whether said statistical deviation is abnormal;
flagging abnormal activity;
incrementing said abnormality counter responsive to a positive determination;
incrementing said step counter;
determining a decision ratio between said abnormality counter and said step counter;
comparing said decision ratio with said preset reference ratio; and
providing an intrusion warning if said decision ratio exceeds said preset reference ratio.

2. The method of claim 1 further comprising:
blocking said IoT device from the network if an intrusion warning is provided.

3. The method of claim 1 further comprising:
reporting said intrusion warning to a remote IoT device if an intrusion warning is provided.

4. The method of claim 2 further comprising:
reporting said blocking to a remote IoT device if said IoT device is blocked from the network.

\* \* \* \* \*